United States Patent
Kohvakka et al.

(10) Patent No.: US 11,334,055 B2
(45) Date of Patent: May 17, 2022

(54) METHOD FOR CONFIGURING AUTOMATION APPARATUS, AUTOMATION APPARATUS, AND READER APPARATUS

(71) Applicant: ABB Schweiz AG, Baden (CH)

(72) Inventors: Mikko Kohvakka, Helsinki (FI); Janne Kallio, Helsinki (FI)

(73) Assignee: ABB Schweiz AG, Baden (CH)

( * ) Notice: Subject to any disclaimer, the term of this patent is extended or adjusted under 35 U.S.C. 154(b) by 88 days.

(21) Appl. No.: 16/864,216

(22) Filed: May 1, 2020

(65) Prior Publication Data

US 2020/0348652 A1    Nov. 5, 2020

(30) Foreign Application Priority Data

May 2, 2019   (EP) .................................... 19172188

(51) Int. Cl.
*G05B 19/418* (2006.01)
*H04W 4/38* (2018.01)
*H04W 4/80* (2018.01)

(52) U.S. Cl.
CPC .......... *G05B 19/4185* (2013.01); *H04W 4/38* (2018.02); *H04W 4/80* (2018.02)

(58) Field of Classification Search
CPC ....... G05B 19/4185; H04W 4/38; H04W 4/80
USPC .......................................................... 700/9
See application file for complete search history.

(56) References Cited

U.S. PATENT DOCUMENTS

| | | | |
|---|---|---|---|
| 7,463,149 B2 | 12/2008 | Friedrich et al. | |
| 9,449,265 B1 * | 9/2016 | Maguire | G06K 7/10356 |
| 9,703,499 B2 * | 7/2017 | Nakano | G06F 3/065 |
| 10,742,145 B2 * | 8/2020 | Maillet | G06K 7/10297 |
| 2004/0002305 A1 * | 1/2004 | Byman-Kivivuori | H04L 29/06 455/41.2 |
| 2004/0087273 A1 * | 5/2004 | Perttila | H04W 4/02 455/41.2 |
| 2004/0177032 A1 * | 9/2004 | Bradley | G06K 17/00 705/38 |
| 2006/0133175 A1 * | 6/2006 | Gutnik | G06K 19/0723 365/225.7 |
| 2008/0041930 A1 * | 2/2008 | Smith | G06F 9/44505 235/375 |

(Continued)

FOREIGN PATENT DOCUMENTS

| | | | | |
|---|---|---|---|---|
| CN | 101211420 A | * | 7/2008 | ......... G08B 13/2417 |
| CN | 101685505 A | * | 3/2010 | |

(Continued)

OTHER PUBLICATIONS

European Patent Office, Search Report issued in corresponding Application No. 19172188.5, dated Oct. 30, 2019, 2 pp.

*Primary Examiner* — Ly D Pham
(74) *Attorney, Agent, or Firm* — Leydig, Voit & Mayer, Ltd.

(57) ABSTRACT

An automation apparatus, a reader apparatus, and a method for configuring an automation apparatus. The method includes: harvesting wirelessly, by a passive electronic tag, energy from a reader apparatus; receiving wirelessly, by the passive electronic tag, configuration data from the reader apparatus; storing, by the passive electronic tag, the configuration data to a non-volatile memory of the passive electronic tag; and reading, by a processor, the configuration data from the passive electronic tag.

12 Claims, 4 Drawing Sheets

(56) References Cited

U.S. PATENT DOCUMENTS

| | | | |
|---|---|---|---|
| 2008/0136621 A1* | 6/2008 | Malik | H04W 48/14 340/539.1 |
| 2009/0206154 A1 | 8/2009 | Pietrzyk et al. | |
| 2013/0190897 A1 | 7/2013 | Junk et al. | |
| 2014/0375428 A1* | 12/2014 | Park | H04L 67/22 340/10.1 |
| 2015/0227832 A1* | 8/2015 | Diorio | G06K 19/07754 235/492 |
| 2016/0078215 A1* | 3/2016 | Robshaw | H04L 63/18 340/10.42 |
| 2016/0321477 A1* | 11/2016 | Reffe | G06F 16/955 |
| 2016/0364680 A1* | 12/2016 | Debates | G06K 7/0008 |
| 2017/0227660 A1* | 8/2017 | Zhang | A61B 6/563 |
| 2018/0121687 A1* | 5/2018 | Gauthier | B64D 47/02 |
| 2018/0341794 A1* | 11/2018 | Balasubramanian | G06K 7/0008 |
| 2020/0042850 A1* | 2/2020 | Singh | H04B 1/40 |

FOREIGN PATENT DOCUMENTS

| | | | |
|---|---|---|---|
| CN | 202159352 U | * | 3/2012 |
| EP | 1647869 A2 | | 4/2006 |
| WO | 2016099679 A1 | | 6/2016 |

\* cited by examiner

METHOD FOR CONFIGURING AUTOMATION APPARATUS, AUTOMATION APPARATUS, AND READER APPARATUS

FIELD

Various example embodiments relate to an automation apparatus, a reader apparatus for the automation apparatus, and a method for configuring the automation apparatus.

BACKGROUND

Automation apparatuses are used in process control and automation solutions of various industries. As sites may be large and/or distributed, configuration of automation apparatuses is a demanding task (in view of technical implementation, usabililty, data security, reliability if mechanical solutions such as rotary switches are used, etc.). Further sophistication is clearly desirable.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Figure 1:
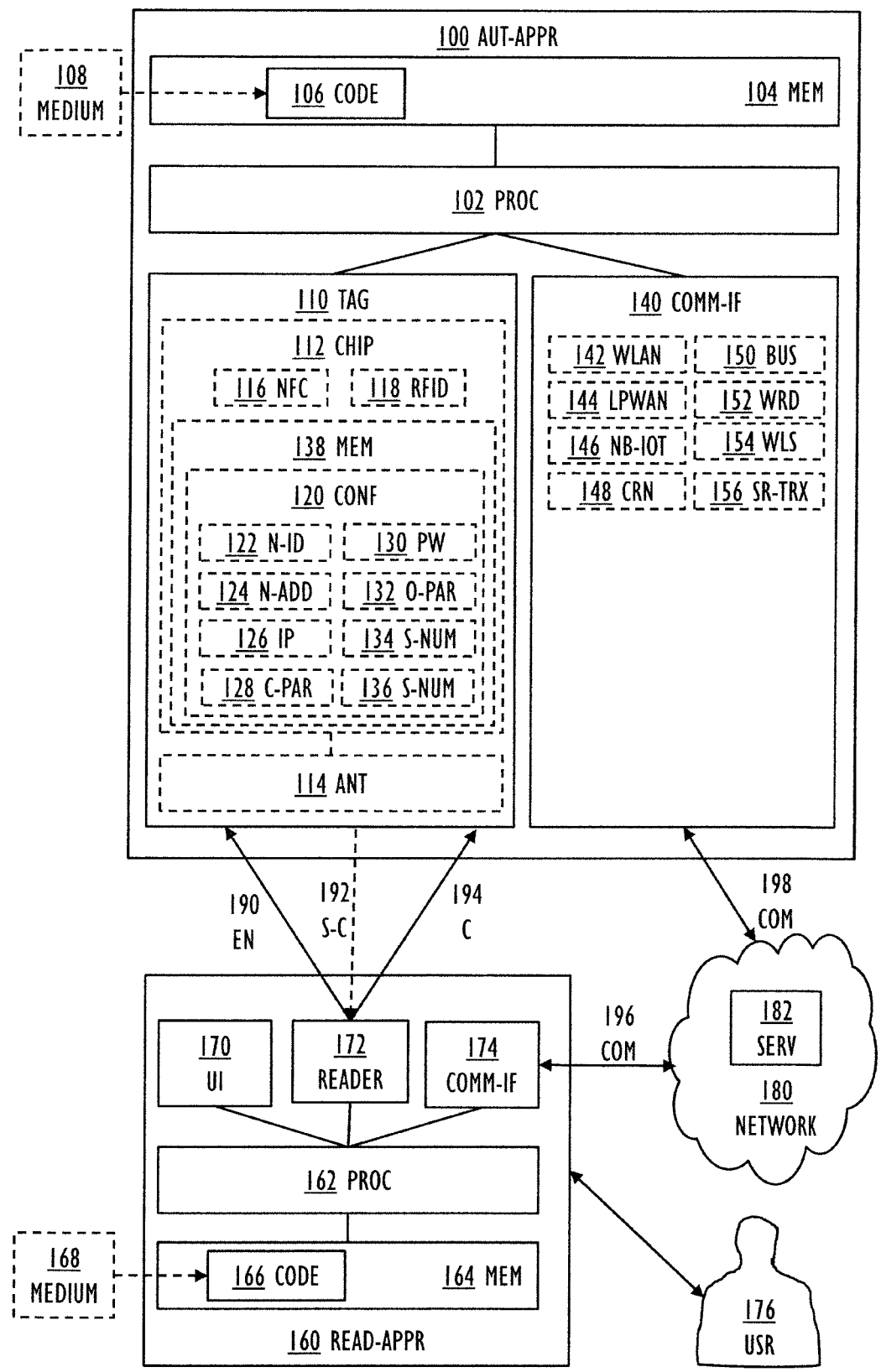
Figure 2:
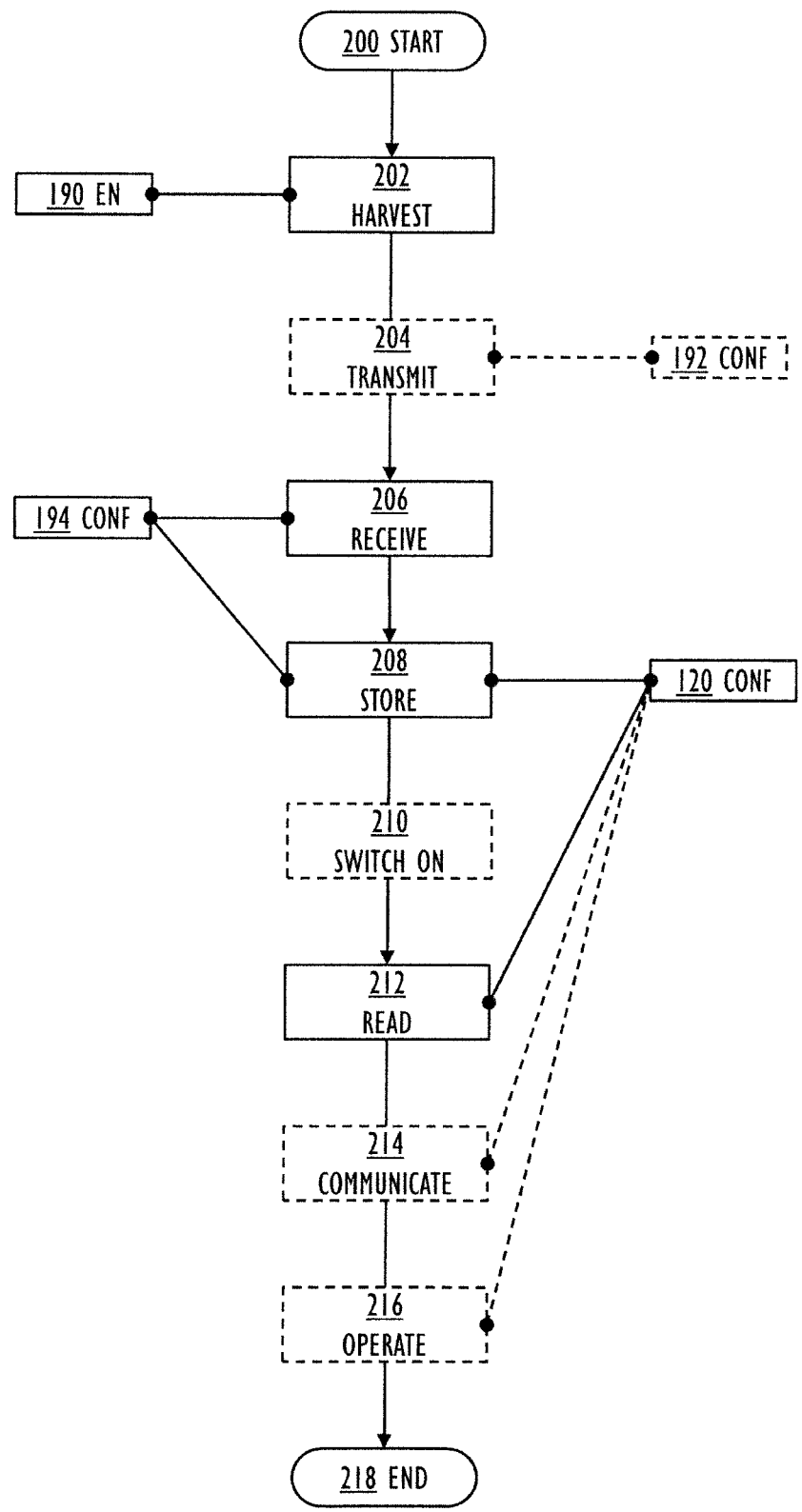
Figure 3:
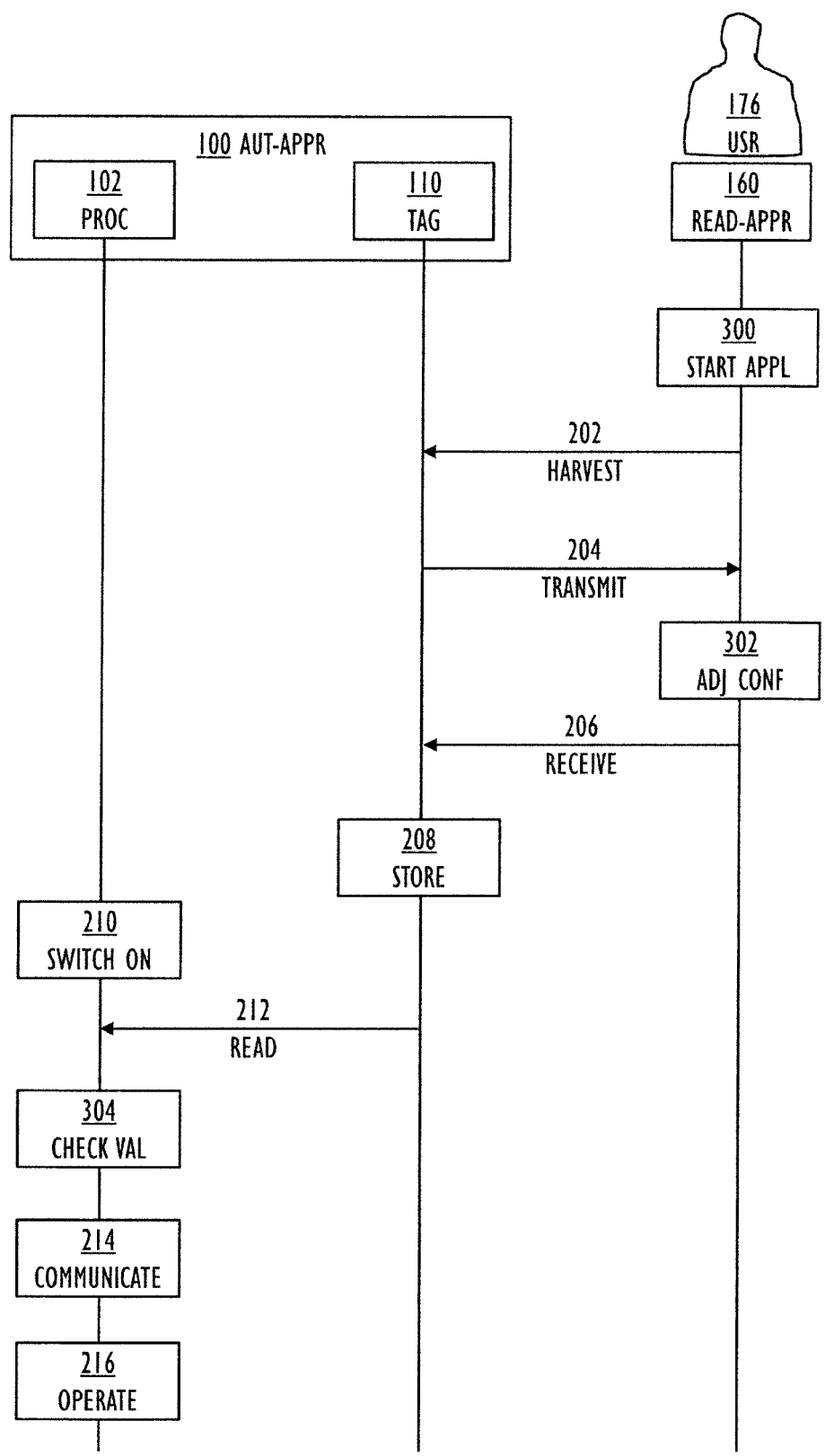
Figure 4:
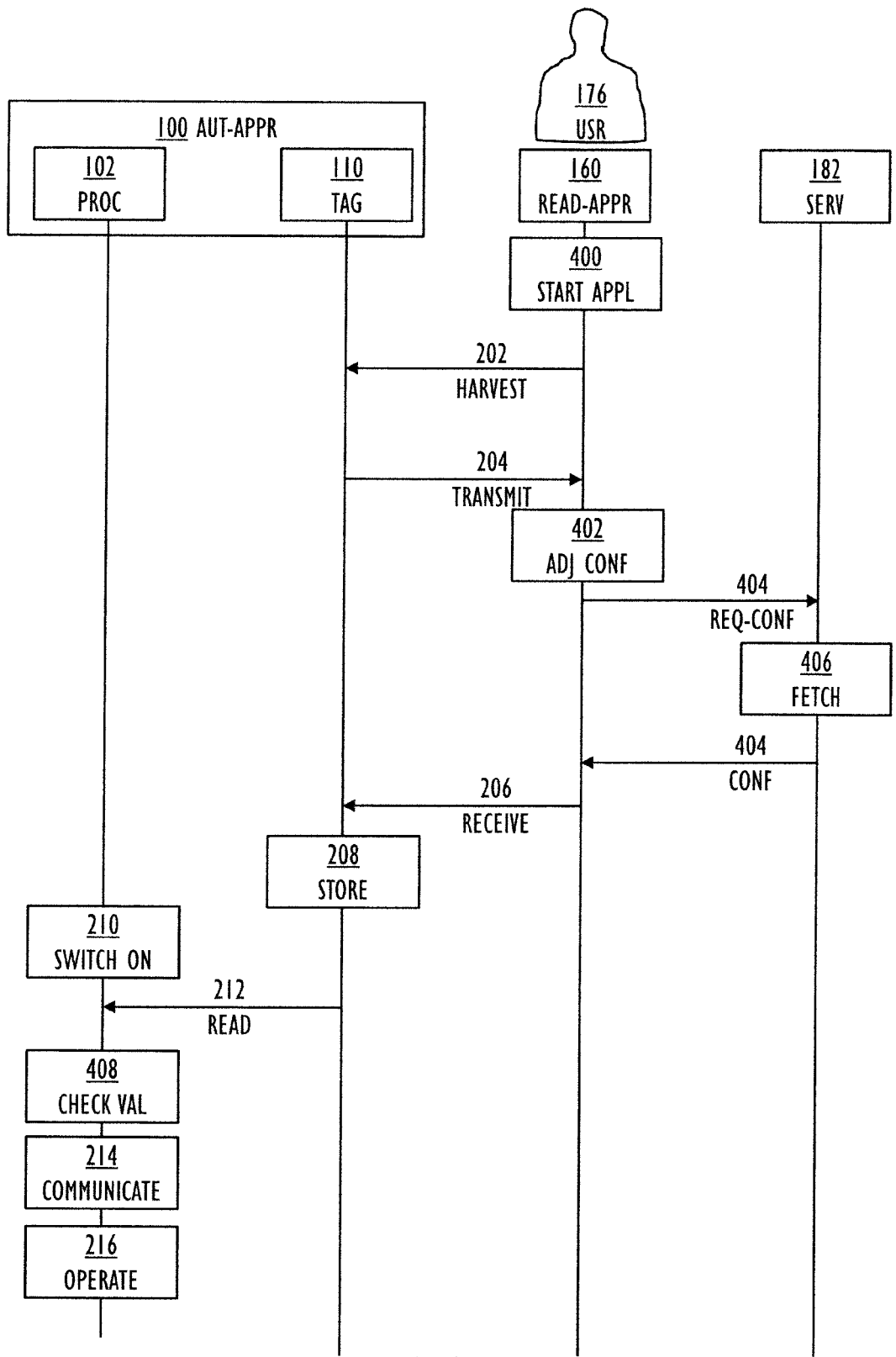

Some example embodiments will now be described with reference to the accompanying drawings, in which FIG. 1 is a block diagram illustrating example embodiments of an automation apparatus and a reader apparatus;

FIG. 2 is a flow-chart illustrating example embodiments of a method for configuring the automation apparatus; and FIG. 3 and FIG. 4 are signal sequence charts illustrating example embodiments of the automation apparatus, the reader apparatus, and the method for configuring the automation apparatus.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

Let us study simultaneously both FIG. 1, which illustrates example embodiments of an automation apparatus 100 and a reader apparatus 160, and FIG. 2, which illustrates example embodiments of a method for configuring the automation apparatus 100.

The automation apparatus 100 may be used in process control and automation solutions of numerous industries including, but not limited to: aluminium production, building and facilities, cement and glass, chemicals, data center automation, energy and utilities, food and beverage manufacturing, marine vessel management, metals processing, mining and minerals processing, oil, gas and petrochemical, original equipment manufacturers, pharmaceutical and life sciences, printing newspapers, ports, pulp and paper manufacturing, road and tunnel infrastructure, water and wastewater.

The method starts in 200, and ends in 218.

The automation apparatus 100 comprises a passive electronic tag 110 and a processor 102 connected (by a wired connection, implemented by a wiring or another type of transmission media such as a conductive track, for example) to the passive electronic tag 110. The passive electronic tag 110 is configured to harvest 202 wirelessly energy 190 from the reader apparatus 160, receive 206 wirelessly configuration data 194 from the reader apparatus 160, and store 208 the configuration data 194, 120 to a non-volatile memory 138 of the passive electronic tag 110.

In an example embodiment, the passive electronic tag 110 is configured to operate using one or more of the following: near-field communication (NFC) technology 116, radio-frequency identification (RFID) technology 118.

As shown in FIG. 1, the passive electronic tag 110 may comprise a chip (or an integrated circuit) 112 and an antenna 114. The non-volatile memory 138 (such as a flash memory) may be implemented within the chip 112 or coupled with the chip 112. The chip 112 is configured to receive energy (for data processing, data transfer and memory operations) from a magnetic induction between the antenna 114 and the reader apparatus 160, receive data from the reader apparatus 160, write the data to the non-volatile memory 138, read data from the non-volatile memory 138, and transmit data to the reader apparatus 160. The antenna 114 may be coil-shaped and made of copper or aluminium, for example.

In an example embodiment, the reader apparatus 160 is active, i.e., the reader apparatus 160 transmits interrogation radio signals, and may receive radio signals from the passive electronic tag 110, which is powered by the interrogation signals.

The processor 102 is configured to read 212 the configuration data 120 from (the non-volatile memory 138 of) the passive electronic tag 110.

The processor 102 is configured to cause the automation apparatus 100 to perform the method for configuring the automation apparatus 100.

The processor 102 may be implemented with one or more processors (such as microprocessors or microcontrollers) 102, and one or more memories 104 including computer program code 106. The one or more memories 104 and the computer program code 106 are configured to, with the one or more processors 102, cause performance of data processing operations of the access control apparatus 100.

The term 'processor' 102 refers to a device that is capable of processing data. Depending on the processing power needed, the access control apparatus 100 may comprise several processors 102 such as parallel processors, a multi-core processor, or a computing environment that simultaneously utilizes resources from several physical computer units (sometimes these are referred as cloud, fog or virtualized computing environments). When designing the implementation of the processor 102, a person skilled in the art will consider the requirements set for the size and power consumption of the control apparatus 100, the necessary processing capacity, production costs, and production volumes, for example.

A non-exhaustive list of implementation techniques for the processor 102 and the memory 104 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 106 may be implemented by software. In an example embodiment, the software may be written by a suitable programming language, and the resulting executable code may be stored in the memory 104 and run by the processor 102.

An example embodiment provides a computer-readable medium 108 storing computer program code 106, which, when loaded into the one or more processors 102 and executed by one or more processors 102, causes the one or more processors 102 to perform the computer-implemented method for configuring the automation apparatus 100, which will be explained with reference to FIG. 2. The computer-readable medium 108 may comprise at least the following: any entity or device capable of carrying the computer program code 106 to the processor 102, a record medium, a computer memory, a read-only memory, an electrical carrier signal, a telecommunications signal, and a software distribution medium. In some jurisdictions, depending on the legislation and the patent practice, the computer-readable medium 108 may not be the telecommunications signal. In an example embodiment, the computer-readable medium 108 may be a computer-readable storage medium. In an example embodiment, the computer-readable medium 108 may be a non-transitory computer-readable storage medium.

In an example embodiment, the passive electronic tag 110 is configured to harvest 202 wirelessly the energy 190, receive 206 wirelessly the configuration data 194, and store 208 the configuration data 194, 120 (to the non-volatile memory 138) while the processor 102 is switched off. The processor 102 is configured to read 212 the stored configuration data 120 from the passive electronic tag 110 after the processor 102 is switched on 210. In this way, the automation apparatus 100 may be configured even when there is no power available. The configuration may thus be made during the manufacturing of the automation apparatus 100. The configuration may also be made in the warehouse, after an order for the automation apparatus 100 has been received, for example. The configuration may also be made during or after the installation of the automation apparatus 100 at the (industrial) site. After the automation apparatus 100 is powered on, the configuration data 120 is read from the passive electronic tag 110.

In an example embodiment, the passive electronic tag 110 is configured to transmit 204 wirelessly previously stored configuration data 192 (in the non-volatile memory 138) after harvesting 202 wirelessly the energy 190 and before receiving 206 wirelessly the configuration data 194. In this way, a user 176 of the reader apparatus 160 may check the previously stored configuration data 192 in order to decide whether the configuration data needs to be changed or updated. The previously stored configuration data 192 may have been stored in (the non-volatile memory 138 of) the passive electronic tag 192 during manufacturing of the automation apparatus 100, or during installation of the automation apparatus 100, or during a previous configuration session. It is also possible that the previously stored configuration data 194 has first been inputted via a user interface of the automation apparatus 100, or via the communication interface 140 of the automation apparatus 100, and then copied into the non-volatile memory 138 of the passive electronic tag 110. The reader apparatus 160 may update the configuration data 192 based on user interface 170 operations by the user 176 and/or via the communication interface 174 from a networked service 182.

In an example embodiment, the previously stored configuration data 192 comprises a serial number 136 of the automation apparatus 100. The serial number 136 may be a unique identifier of the automation apparatus 100. The reader apparatus 160 may check the validity of the serial number 136 by communicating via the communication interface 174 with the networked service 182. The reader apparatus 160 may also request the configuration data 194 from the networked service 182 based on the valid serial number 136.

Let us next consider the nature of the configuring. The configuring may relate at least to two different aspects of the automation apparatus 100: communication and/or operation.

In an example embodiment, the automation apparatus 100 further comprises one or more communication interfaces 140 to which the processor 102 is also connected. The processor 102 is configured to communicate 214 via the one or more communication interfaces 140 using the configuration data 120 read from the passive electronic tag 110.

The one or more communication interfaces 140 may operate with appropriate wired/wireless communication technologies and standard/proprietary protocols.

In an example embodiment, the configuration data 194, 120 comprises one or more of the following: a node identifier 122, a node address 124, an Internet protocol address 126, one or more communication protocol parameters 128, a password 130 (such as a Personal Identification Number PIN) of a subscriber identity module related to the one or more communication interfaces 140.

In an example embodiment, the one or more communication interfaces 140 are configured to communicate 214 using one or more of the following: a wireless local area network (WLAN) 142, a low power wide area network (LPWAN) 144, a narrowband Internet of things (NB-IoT) 146, a cellular radio network 148, a bus interface 150 122 (such as an industrial communication bus), a wired communication interface 152 (such as Ethernet), a wireless communication interface 154, a short-range wireless transceiver 156 (such as Bluetooth, or Bluetooth Low Energy BLE). In an example embodiment, the processor 102 is configured to operate 216 the automation apparatus 100 according to the configuration data 194, 120 read from the passive electronic tag 110.

In an example embodiment, the configuration data 194, 120 comprises one or more of the following operation parameters 132 of the automation apparatus 100: a date, a time, a time zone, daylight saving settings, a motor control mode (such as scalar, direct torque control (DTC), etc.), motor nameplate values (such as nominal voltage, nominal frequency, nominal power, nominal speed, nominal current, nominal torque, nominal cos phi, etc.), acceleration and deacceleration ramp settings, a maximum speed, a maximum current, a maximum torque, control signal settings (such as a source for start/stop command, a source of rotation direction, which is typically some digital input or fieldbus), a speed reference selection (which is typically some analog input or fieldbus), a supply voltage of a drive.

The reader apparatus 160 comprises a user interface 170 configured to interact with the user 176. The user interface 170 is configured to implement exchange of graphical, textual and/or auditory information with the user 176. The user interface 170 may be realized with various techniques, such as a display, touch pad, touch-screen, loudspeaker, keyboard/keypad/push buttons/rotary buttons, speech recognition system enabling audio control, cursor control device (mouse, track ball, arrow keys, touch sensitive area etc.), haptic feedback technology, etc. The user 176 may be a local worker (such as a factory technician) working in an industrial site, or a visiting worker (such as a service engineer) commissioning or servicing the automation apparatus 100.

The reader apparatus 160 comprises a communication interface 174 configured to communicate with a network 180. The communication interface 174 may operate with appropriate wired/wireless communication technologies and standard/proprietary protocols, including, but not limited to: a cellular radio network technology, a wireless local area network technology.

The reader apparatus 160 comprises a reader 172 configured to provide wirelessly energy 190 for the passive electronic tag 110, and transmit wirelessly configuration data 194 to the passive electronic tag 110. The reader 172 may comprise a radio transceiver to implement the required transmission of energy, transmission of data, and reception of data.

The reader apparatus 160 comprises a processor 162 connected to the user interface 170, the communication interface 174, and the reader 172. The processor 162 may be implemented in similar ways as the processor 102 of the automation apparatus 100.

The processor 162 is configured to receive at least a part of the configuration data 194 from the user interface 170 and/or via the communication interface 174 from a networked service 182.

Let us consider these two example embodiments, first the reception of the configuration data 194 from the user interface 170 with reference to FIG. 3, and next the reception of the configuration data 194 via the communication interface 174 from the networked service 182 with reference to FIG. 4.

In FIG. 3, the user 176 starts 300 a configuration application in the reader apparatus 160. The passive electronic tag 110 harvests 202 wirelessly the energy from the reader apparatus 160 and transmits 204 wirelessly the previously stored configuration data 192 (possibly in response to a read command from the reader apparatus 160). The user 176 sees the previously stored configuration data 192 and adjusts 302 with the configuration application the previously stored configuration data 192 in order to generate the configuration data 194. The passive electronic tag 110 receives 206 wirelessly the configuration data 194 from the reader apparatus 160 (i.e., the reader apparatus 160 writes the configuration data 194 to the passive electronic tag 110), and stores 208 the configuration data 194, 120. After the configuration, the processor 102 may be switched 210 on (if it was switched off), and the processor 102 reads 212 the configuration data 120 from the passive electronic tag 110. The processor 102 may check 304 the validity of the configuration data 120. If everything is all right, the communication 214 and/or the operation 216 may commence as previously explained, else, the user 176 may be informed of the invalid configuration data 120 (via a user interface of the automation apparatus 100, or via the user interface 170 of the reader apparatus 160), and requested to perform the configuration again in order to correct the configuration data 120.

In FIG. 4, the user 176 starts 400 a configuration application in the reader apparatus 160. The passive electronic tag 110 harvests 202 wirelessly the energy from the reader apparatus 160 and transmits 204 wirelessly the previously stored configuration data 192 (possibly in response to a read command from the reader apparatus 160). The user 176 sees the previously stored configuration data 192 and adjusts 402 with the configuration application the previously stored configuration data 192 by requesting 404 a new version from the networked service 182. The networked server 182 fetches the configuration data 194 from a database and transmits 404 the configuration data 194 to the reader apparatus 160. The passive electronic tag 110 receives 206 wirelessly the configuration data 194 from the reader apparatus 160 (i.e., the reader apparatus 160 writes the configuration data 194 to the passive electronic tag 110), and stores 208 the configuration data 194, 120. After the configuration, the processor 102 may be switched 210 on (if it was switched off), and the processor 102 reads 212 the configuration data 120 from the passive electronic tag 110. The processor 102 may check 408 the validity of the configuration data 120. If everything is all right, the communication 214 and/or the operation 216 may commence as previously explained, else, the user 176 may be informed of the invalid configuration data 120 (via a user interface of the automation apparatus 100, or via the user interface 170 of the reader apparatus 160), and requested to perform the configuration again in order to correct the configuration data 120.

The reader apparatus 160 may be a computer, laptop computer, tablet computer, phablet, mobile phone, smartphone, general-purpose mobile computing device, or some other electronic apparatus enabling user interaction. The reader apparatus 160 may be a general-purpose off-the-shelf computing device, as opposed to a purpose-build proprietary equipment, whereby research & development costs will be lower as only the special-purpose software (and not the hardware) needs to be designed, implemented and tested.

The networked service 182 may be implemented by one or more computer servers accessible via the network 180 (which may include a wired network such as the Internet and/or one or more wireless networks such as cellular radio networks). The networked service 182 may interoperate with the automation apparatus 100 according to a client-server architecture, a cloud computing architecture, a peer-to-peer system, or another applicable distributed computing architecture.

Even though the invention has been described with reference to one or more example embodiments according to the accompanying drawings, it is clear that the invention is not restricted thereto but can be modified in several ways within the scope of the appended claims. All words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. An automation apparatus, comprising:
a passive electronic tag configured to harvest wirelessly energy from a reader apparatus, receive wirelessly configuration data from the reader apparatus, and store the configuration data to a non-volatile memory of the passive electronic tag; and a processor, connected to the passive electronic tag, and configured to read the configuration data from the passive electronic tag, wherein the passive electronic tag is configured to harvest wirelessly the energy, receive wirelessly the configuration data, and store the configuration data while the processor is switched off, and the processor is configured to read the stored configuration data from the passive electronic tag after the processor is switched on.

2. The automation apparatus of claim 1, further comprising one or more communication interfaces, and the processor, connected also to the one or more communication interfaces, configured to communicate via the one or more communication interfaces using the configuration data read from the passive electronic tag.

3. The automation apparatus of claim 2, wherein the configuration data comprises one or more of the following: a node identifier, a node address, an Internet protocol address, one or more communication protocol parameters, a password of a subscriber identity module related to the one or more communication interfaces.

4. The automation apparatus of claim 2, wherein the one or more communication interfaces are configured to communicate using one or more of the following: a wireless local area network (WLAN), a low power wide area network (LPWAN), a narrowband Internet of things (NB-IoT), a cellular radio network, a bus interface, a wired communication interface, a wireless communication interface, a short-range wireless transceiver.

5. The automation apparatus of claim 1, wherein the processor is configured to operate the automation apparatus according to the configuration data read from the passive electronic tag.

6. The automation apparatus of claim 5, wherein the configuration data comprises one or more of the following operation parameters of the automation apparatus: a date, a time, a time zone, daylight saving settings, a motor control mode, motor nameplate values, acceleration and deacceleration ramp settings, a maximum speed, a maximum current, a maximum torque, control signal settings, a speed reference selection, a supply voltage of a drive.

7. The automation apparatus of claim 1, wherein the passive electronic tag is configured to transmit wirelessly previously stored configuration data after harvesting wirelessly the energy and before receiving wirelessly the configuration data.

8. The automation apparatus of claim 7, wherein the previously stored configuration data comprises a serial number of the automation apparatus.

9. The automation apparatus of claim 1, wherein the passive electronic tag is configured to operate using one or more of the following:

near-field communication (NFC) technology, radio-frequency identification (RFID) technology.

10. The reader apparatus for the automation apparatus of claim 1, the reader apparatus comprising:

a user interface configured to interact with a user;

a communication interface configured to communicate with a network;

a reader configured to provide wirelessly energy for the passive electronic tag, transmit wirelessly configuration data to the passive electronic tag; and a reader processor, connected to the user interface, the communication interface, and the reader, and configured to receive at least a part of the configuration data from the user interface and/or via the communication interface from a networked service.

11. A method for configuring an automation apparatus, comprising:

harvesting wirelessly, by a passive electronic tag, energy from a reader apparatus;

receiving wirelessly, by the passive electronic tag, configuration data from the reader apparatus;

storing, by the passive electronic tag, the configuration data to a non-volatile memory of the passive electronic tag; and reading, by a processor, the configuration data from the passive electronic tag, wherein the passive electronic tag harvests wirelessly the energy, receives wirelessly the configuration data, and stores the configuration data while the processor is switched off, and wherein the processor reads the stored configuration data from the passive electronic tag after the processor is switched on.

12. The method of claim 11, further comprising:

receiving wirelessly at least a part of the configuration data generated by a user interface and/or received from a networked service.

* * * * *